Aug. 16, 1949.  J. A. McHUGH  2,479,015
POWER ACTUATED LAWN MOWER
Filed May 14, 1948  2 Sheets-Sheet 1

INVENTOR
J. A. McHugh

ATTORNEYS

Aug. 16, 1949.    J. A. McHUGH    2,479,015
POWER ACTUATED LAWN MOWER
Filed May 14, 1948    2 Sheets—Sheet 2

INVENTOR
J. A. McHugh
BY
ATTORNEYS

Patented Aug. 16, 1949

2,479,015

UNITED STATES PATENT OFFICE 2,479,015

POWER ACTUATED LAWN MOWER

James A. McHugh, Stockton, Calif.

Application May 14, 1948, Serial No. 27,048

1 Claim. (Cl. 56—26)

This invention relates to improvements in power operated lawn mowers of the rider type.

The primary object of the invention is to produce a mower of this type in which a rider vehicle body is preferably supported at the rear on wheels which are in turn driven by power means such as an internal combustion engine, or the like, mounted on the body and connected in driving relation with the wheels; and in connection with this wheel mounted and driven body to support the front end thereof on the framework of a lawn mower of generally conventional type; the connection between the vehicle body and the mower being such that the mower may be steered in any direction and at the same time be capable of rocking vertically whereby to automatically adjust itself to inequalities in the lawn surface over which it rides.

Another object of the invention is to provide a simplified type of power driven lawn mower which may be readily assembled from already manufactured items such as the so-called scooter type of vehicle and any standard lawn mower with the use of but a few additional parts.

A further object of the invention is to produce a practical device and one which will be exceedingly effective for the purpose for which it is designed.

These objects are accomplished by means of such structure and relative arrangement of parts as will fully appear by a perusal of the following specification and claim:

Figure 1:
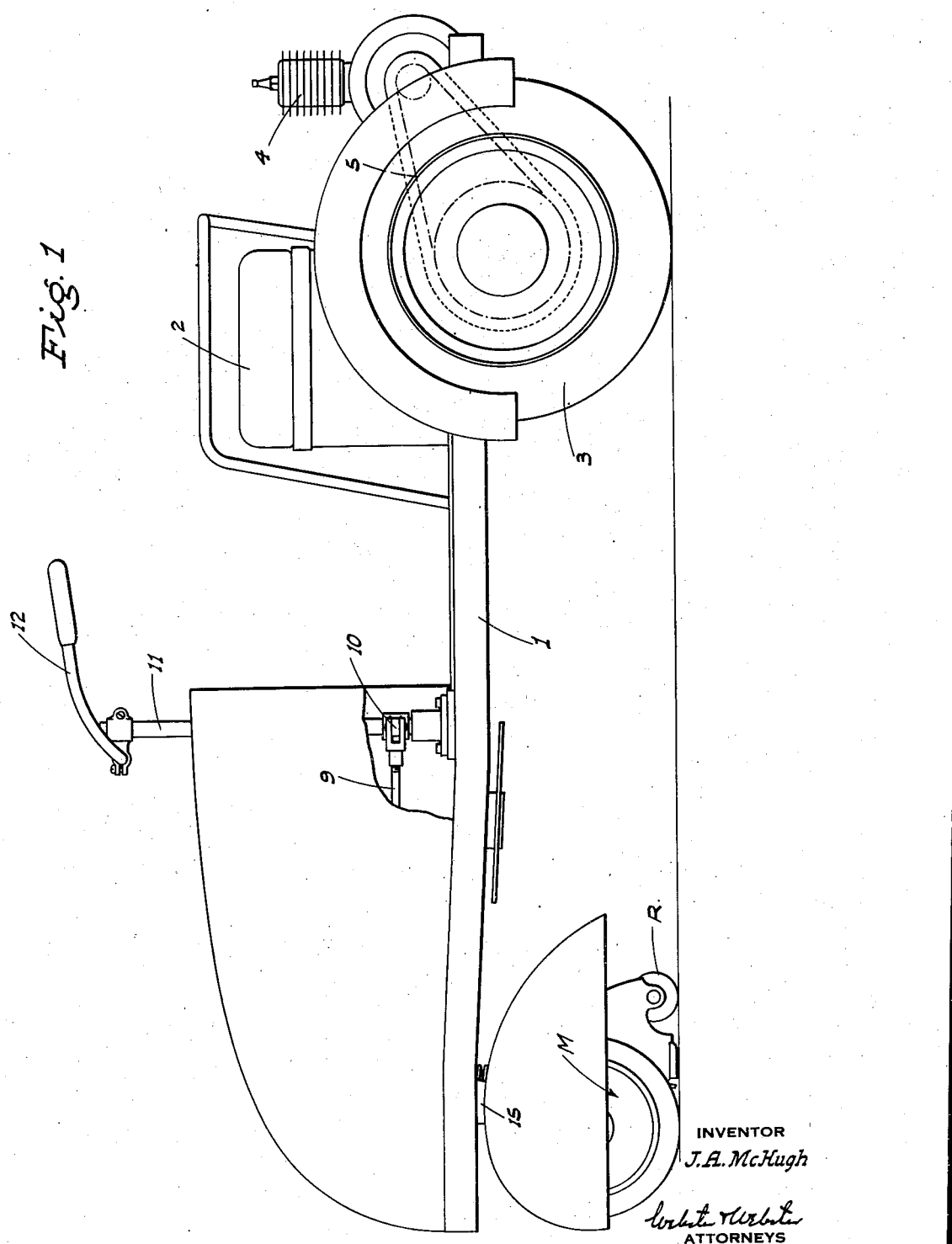
Figure 1 is a side elevation of the mower.
Figure 2:
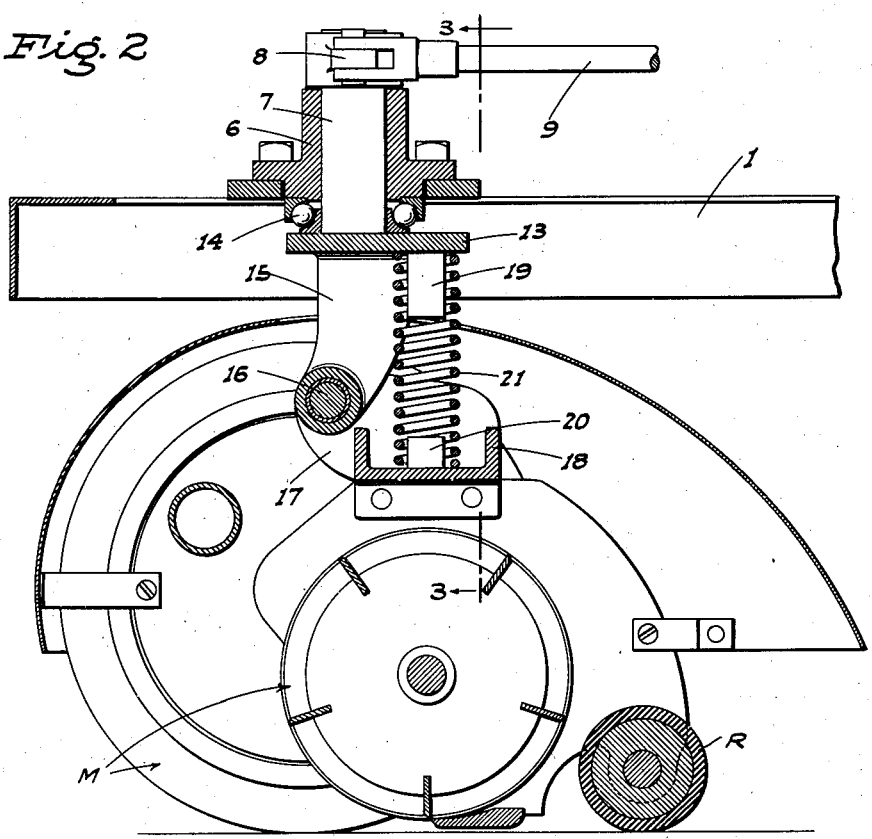
Figure 2 is a vertical section through the front end of the vehicle body and the supporting lawn mower structure.
Figure 3:
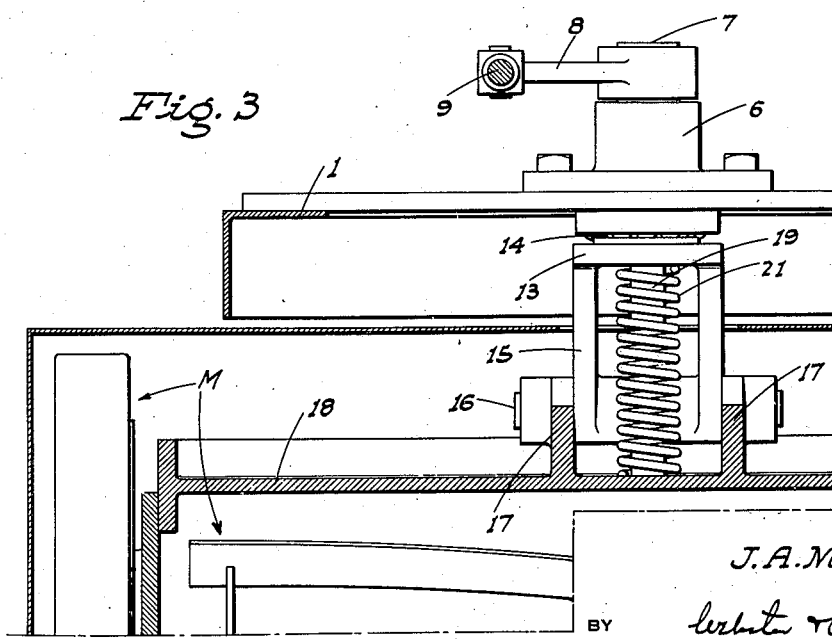
Figure 3 is a sectional view taken on a line 3—3 of Figure 2.

Referring now more particularly to the characters of reference on the drawings, the numeral 1 designates the vehicle body carrying the rider's seat 2. At its rear end the body 1 is supported on wheels 3 which are power driven by means of an engine 4 connected in driving relation with the wheels 3 by driving belts 5 or equivalent driving means.

At its forward end the vehicle body 1 is provided with an upstanding sleeve 6 through which a spindle 7 is turnably mounted. Fixed to the spindle 7 is a steering arm 8. A steering rod 9 connects between the arm 8 and another steering arm 10 on the steering post 11 which is disposed adjacent the rider's seat 2 and provided with steering handles 12.

A platform 13 is fixed to the spindle 7 below the sleeve 6 and anti-friction bearings 14 are interposed between the platform 13 and the sleeve.

Depending from the platform 13 is a steering fork 15 pivoted by a pin 16 with upstanding ears 17 formed on a top bar 18 attached to a lawn mower M of conventional form. By means of the spindle 7 and associated parts the mower M may be steered horizontally in any direction and by means of the pivot pin 16 the body of the mower M may tilt vertically to adjust itself to the inequalities of the lawn surface. To allow of this tilting movement and still hold the mower down to position on the lawn surface, the following described yieldable holding means is provided:

Back of the pin 16 the platform 13 is provided with a depending lug 19. A similar lug 20 upstands from the bar 18 in alinement with the lug 19. A compression spring 21 is fitted over the lugs 19 and 20 and interposed between the platform 13 and bar 18.

Since the spring 21 is positioned back of the pivot pin 16 and between the platform 13 and bar 18, it functions to normally hold the back control roller R of the mower M down against the lawn surface. However, should the roller encounter an unevenness in the lawn surface the spring will compress or yield accordingly and thus maintain the cutting parts of the mower in proper cutting position, and this will be true at any position of the mower to which it may be turned by the steering apparatus.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

In combination: a vehicle body, wheels supporting the body at its rear end, power means on the body connected in driving relation with said wheels, a vertically disposed sleeve disposed adjacent the front end of the vehicle body, a spindle turnably disposed in the sleeve, steering means on the body connected with the spindle, a platform on the spindle below the vehicle body, a steering yoke depending from the platform, a lawn mower, a top bar on the top of the mower, spaced outwardly projecting ears on the bar, a pin pivotally connecting the steering yoke and the ears, the mower including a cutting reel the longitudinal axis of which is to the rear of the longitudinal axis of the pivot pin, a ground engaging roller the longitudinal axis of which is to the rear of the longitudinal axis of the reel, and a compression spring interposed between said top bar and said platform and lying in a vertical plane between the longitudinal axis of the pivot pin and roller respectively.

JAMES A. McHUGH.

REFERENCES CITED

The following references are of record in the file of this patent:

UNITED STATES PATENTS

| Number | Name | Date |
|---|---|---|
| 670,458 | Simpson | Mar. 26, 1901 |
| 787,952 | Slater | Apr. 25, 1905 |
| 1,079,604 | Munsing | Nov. 25, 1913 |
| 1,422,671 | Cochran | July 11, 1922 |